United States Patent [19]

Naujoks et al.

[11] 4,383,325
[45] May 10, 1983

[54] VESSEL OR TANK BOTTOM FOR A PEBBLE-BED REACTOR

[75] Inventors: Manfred Naujoks, Cologne; Gerhard Hantel, Munich, both of Fed. Rep. of Germany

[73] Assignee: Technik mbH GHT, Gesellschaft für Hochtemperaturreaktor, Bergisch Gladbach, Fed. Rep. of Germany

[21] Appl. No.: 199,330

[22] Filed: Oct. 21, 1980

[30] Foreign Application Priority Data

Oct. 22, 1979 [DE] Fed. Rep. of Germany ....... 2942567

[51] Int. Cl.³ .............................................. G21C 19/28
[52] U.S. Cl. ..................................... 376/381; 376/459
[58] Field of Search ........................ 376/381, 458, 459

[56] References Cited

U.S. PATENT DOCUMENTS

| | | | |
|---|---|---|---|
| 4,189,347 | 2/1980 | Reuher et al. | 376/381 |
| 4,234,384 | 11/1980 | Fritz et al. | 376/381 |
| 4,257,845 | 3/1981 | Lukaszewicz et al. | 376/381 |
| 4,290,852 | 9/1981 | Fritz et al. | 376/381 |
| 4,314,883 | 2/1982 | Fritz et al. | 376/381 |

FOREIGN PATENT DOCUMENTS

| | | | |
|---|---|---|---|
| 2817540 | 10/1979 | Fed. Rep. of Germany | 376/381 |
| 2054246 | 2/1981 | United Kingdom | 376/381 |

*Primary Examiner*—Sal Cangialosi
*Attorney, Agent, or Firm*—Herbert L. Lerner; Laurence A. Greenberg

[57] ABSTRACT

Vessel bottom for a gas-cooled pebble-bed reactor, including a multiplicity of blocks having inclined upper surfaces and being disposed adjacent each other side by side with gaps forming therebetween during operation of the reactor, each immediately adjacent two blocks being in the form of a higher block and a lower block, and projections integral with the higher block of each of the immediately adjacent two blocks extended at least partly over the lower block thereof, the projections being wider than the gaps forming between the adjacent blocks.

4 Claims, 4 Drawing Figures

VESSEL OR TANK BOTTOM FOR A PEBBLE-BED REACTOR

The present invention relates to the construction of the bottom for a fuel assembly vessel of a gas-cooled pebble-bed reactor. In such reactors, a bed of numerous spherical fuel elements rests on the bottom; new fuel elements are fed-in at the upper end of the bed, while spent fuel elements are drawn-off at the lower end through one or more funnel-shaped openings. So as to withstand the high temperature of the hot gases of, for instance, 950° C., the bottom is made of graphite in the form of numerous blocks which are stacked side-by-side and, where necessary, on top of each other as well. In order to prevent the occurrence of detrimental compression stresses, the dimensions of the blocks are chosen so that at the operating temperature they just close the gaps which exist therebetween in the cold condition.

If the reactor is shut down, the gaps open up again. With advancing operating time of the reactor, the formation of approximately wedge-shaped gaps at the surface of the blocks can furthermore be expected. These are caused by the shrinkage of the graphite under neutron bombardment and they do not regress. While the width of these gaps is smaller than the diameter of the fuel elements, fragments of destroyed fuel elements or particles which are perhaps broken off from the side reflector of the pressure vessel can settle in the gaps. When the reactor is heated up again, these fragments interfere with the closing of the gaps between the blocks. This circumstance has been tolerated heretofore since it is a rarely occurring event.

In order to have available a second system, independent of the first conventional system, for shutting down nuclear pebble-bed reactors, it has been proposed to dispose a vessel which is filled with balls of a neutron-absorbing material above the reactor. Should the first shut-down device fail, these balls, which are smaller than the fuel element balls, fall into the pebble-bed and trickle into the latter accelerated by the force of gravity. In order to be able to start the reactor up again after the disturbance is corrected, the small absorber balls are made to collect at the bottom of the vessel (for instance, by a certain amount of "stirring" of the pebble-bed by means of the absorber rods of the first shut-down system) and are then removed by the removal device. The danger then exists that numerous absorber balls will settle in the gaps between the blocks when the reactor is cold, and can no longer be removed therefrom. The continued presence of neutron-absorbing material in the reactor tends to influence the nuclear-physical conditions at the lower edge of the pebble bed in an adverse manner which can hardly be estimated in advance; in addition, the absorber balls interfere with the later thermal expansion of the blocks like the fragments already mentioned hereinafore.

It is accordingly an object of the invention to provide a vessel or tank bottom for a pebble-bed reactor, which overcomes the hereinafore-mentioned disadvantages of the heretofore known devices of this general type, and which allows the use of small neutron-absorbing balls for shutting down the reactor.

With the foregoing and other objects in view there is provided, in accordance with the invention, a vessel bottom for a gas-cooled pebble-bed reactor, comprising a multiplicity of blocks having inclined upper surfaces and being disposed adjacent each other side by side with gaps forming therebetween during operation of the reactor, each immediately adjacent two blocks being in the form of a higher block and a lower block, and projections integral with the higher block of each of the immediately adjacent two blocks extended at least partly over the lower block thereof, the projections being wider than the gaps forming between the adjacent blocks. Like in a tile roof, the projection of the respective higher block covers up the gap between the blocks. This coverage is also preserved in the event of a shrinkage of the blocks induced by temperature or a neutron flux.

In conjunction with the use of small absorber balls, and in accordance with another feature of the invention, at least one of the blocks has an opening formed in the inclined upper surface thereof for passage of cooling fluid for the reactor and for receiving balls of neutron-absorbing material for reducing reactivity, the opening having a width being smaller than the diameter of the absorbing balls, and the at least one block having the opening formed therein having a bevel formed at the lower side of the opening, the bevel having an inner edge and an outer edge being lower than the inner edge. A cooling gas such as helium which is discharged through numerous canals disposed in the bottom, flows through the pebble-bed from the top down. The openings of these canals are advantageously slot-shaped in order to prevent the cooling canals from being clogged up by the absorber balls, as could happen if the canals were formed as cylindrical holes. The width of the slot is smaller than the diameter of the absorber balls, so that the latter cannot fall into the canal. With a simple cut in the surface of the blocks, a kind of tray is produced at the low end of the opening, in which a small absorber ball can remain, with the detrimental effects mentioned above.

Bevelling the opening causes the ball to continue rolling in any case in the direction toward the lowest point of the bottom.

In accordance with an added feature of the invention, the blocks are disposed in sets of four aligned blocks being graduated in height from smallest to largest.

In accordance with a concomitant feature of the invention, the smallest height block has a concave upper surface formed of two inclined surfaces, the largest height block has a convex upper surface formed of two inclined surfaces, and the blocks aligned between the smallest and largest blocks each have one inclined upper surface.

Other features which are considered as characteristic for the invention are set forth in the appended claims.

Although the invention is illustrated and described herein as embodied in a vessel or tank bottom for a pebble-bed reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
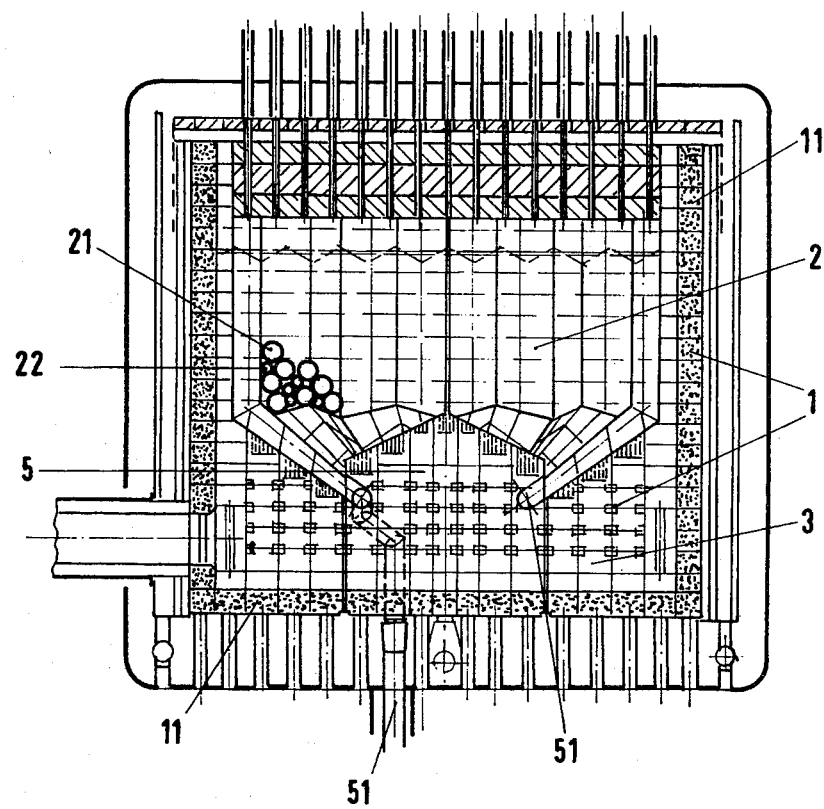
FIG. 1 is a diagrammatic, fragmentary axial longitudinal sectional view taken through a pebble-bed reactor.
Figure 2:
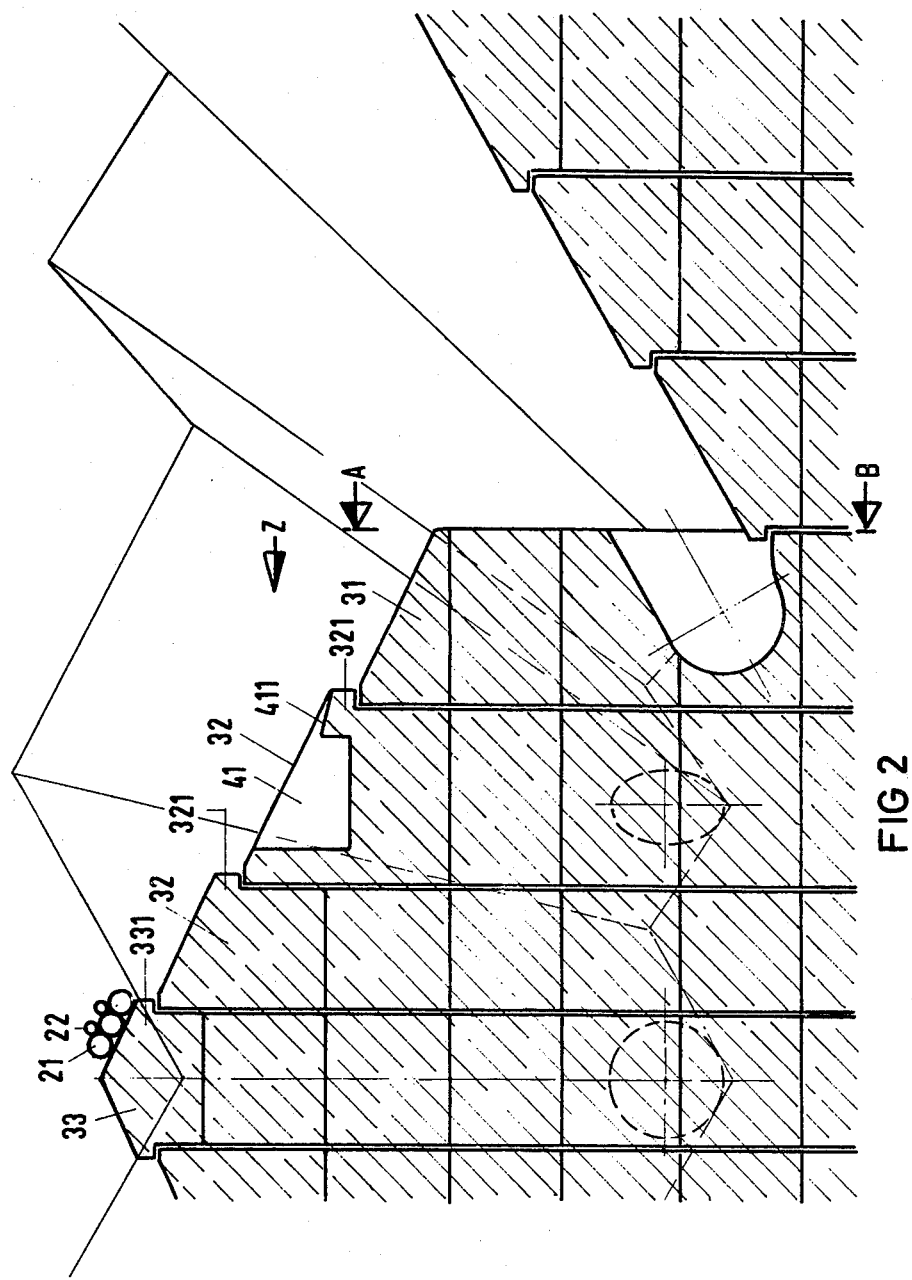
FIG. 2 is an enlarged view of a portion of the bottom structure of FIG. 1.
Figure 3:
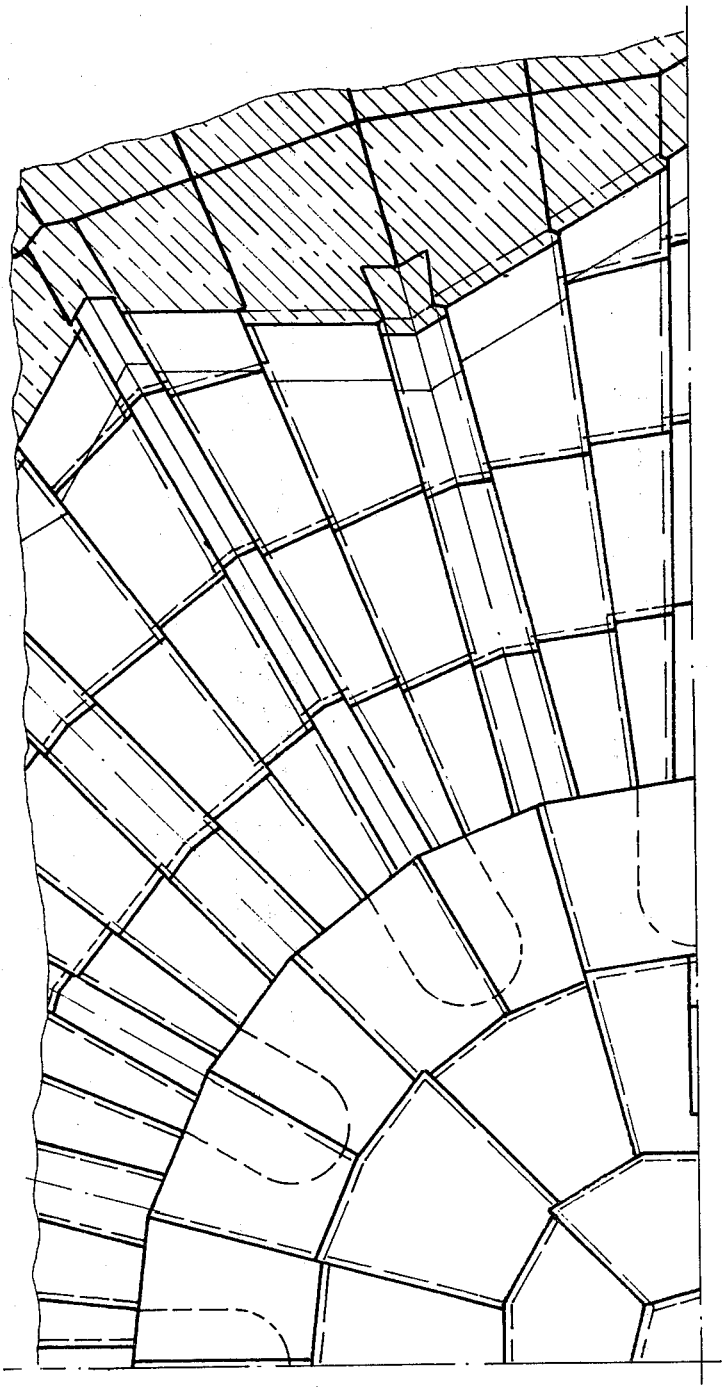
FIG. 3 is a top plan view of the section of FIG. 2.
Figure 4:
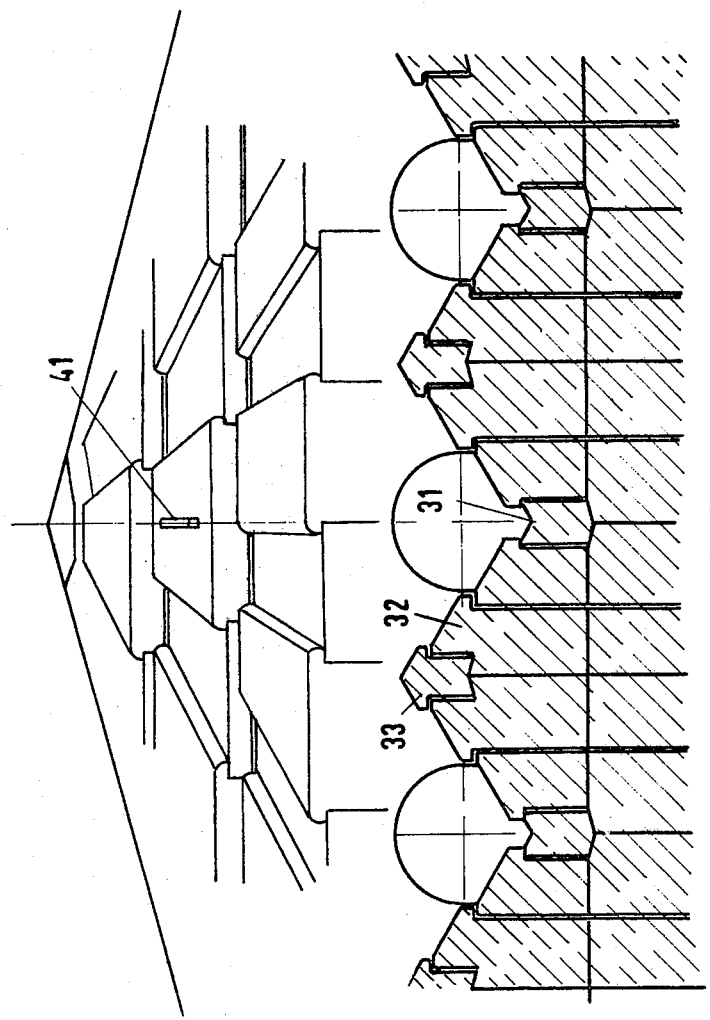
FIG. 4 is a side elevational view taken in the direction Z in FIG. 2.

Referring now to the figures of the drawing and first particularly to FIG. 1 thereof, there is seen a fuel element vessel 1 which is largely filled with a bed 2 of a multiplicity of spherical fuel elements 21. (These are shown in FIG. 1 in a greatly exaggerated scale). The vessel 1 and likewise the bottom 3 of the container is constructed from a multiplicity of individual graphite blocks 11. The bottom 3 is basically funnel-shaped but surfaces which are radially alternatingly inclined toward one or the other side extend over the conical surface of the funnel. The bottom is built-up from three basic types of individual blocks as shown in FIGS. 2, 3 and 4. These are namely ridge blocks 33 and eaves blocks 31, each having two surfaces inclined convex or concave toward each other, and ordinary blocks 32 disposed therebetween with only one inclined surface at the top thereof. In a manner similar to a tile roof, the ridge block 33 extends by means of a formed-on projection 331 over the lower ordinary block 32. A gap disposed between the two blocks, that is shown here in exaggerated size, is thus covered up at the top thereof. The ordinary block 32 extends in a similar manner with a projection 321 over the next lower block of the same type, and the last of the blocks 32 of the same type finally extends over the eaves block 31. The flow cone 5, which is disposed in the center of the tank bottom as shown in FIG. 1, is built from similar overlapping blocks; the flow cone 5 has discharge openings 51 which are distributed over its circumference and through which the spent fuel elements 21 can be withdrawn. The bottom 3 is shot through with a multiplicity of canals and openings 41 shown in FIGS. 2 and 4, through which the cooling gas such as helium for instance, which flows from the top down and is heated up in the pebble-bed 2, can leave the reactor and is fed to non-illustrated parts of the system that consume heat. The canals run at an angle through the bottom 3 and are therefore not visible in the drawing to their full extent. The openings 41 are provided at their respective lower side with a bevel 411, the outer edge of which is lower than the inner edge. Even small absorber balls 22 (likewise shown in exaggerated size in FIG. 1) can roll down on the incline thus formed by the bevel 441. Such balls can be brought into the pebble-bed for shutting down the reactor. The absorber balls first percolate on the pebble-bed 2 and collect at the bottom 3, from where they can likewise be removed through the ball discharge openings 41 when the reactor is to be started up again.

Four of the blocks 31, 32, 33 with an approximately trapezoidal appearance from the top always meet at one point. The blocks opposite each other on a diagonal are always at the same height, while the surfaces of the two opposite blocks in the other diagonal are separated by twice the height such as occurs between directly adjoining blocks.

There are claimed:

1. Vessel bottom for a gas-cooled pebble-bed reactor, comprising a multiplicity of blocks having inclined upper surfaces and being disposed adjacent each other side by side with gaps forming therebetween during operation of the reactor, each immediately adjacent two blocks being in the form of a higher block and a lower block, and projections integral with said higher block of each of said immediately adjacent two blocks extended at least partly over said lower block thereof, said projections being wider than the gaps forming between said adjacent blocks.

2. Vessel bottom according to claim 1, wherein at least one of said blocks has an opening formed in said inclined upper surface thereof for passage of cooling fluid for the reactor and for receiving balls of neutron-absorbing material for reducing reactivity, said opening having a width being smaller than the diameter of the absorbing balls, and said at least one block having said opening formed therein having a bevel formed at the lower side of said opening, said bevel having an inner edge and an outer edge being lower than said inner edge.

3. Vessel bottom according to claim 1 or 2, wherein said blocks are disposed in sets of four aligned blocks being graduated in height from smallest to largest.

4. Vessel bottom according to claim 3, wherein said smallest height block has a concave upper surface formed of two inclined surfaces, said largest height block has a convex upper surface formed of two inclined surfaces, and said blocks aligned between said smallest and largest blocks each have one inclined upper surface.

* * * * *

UNITED STATES PATENT AND TRADEMARK OFFICE
CERTIFICATE OF CORRECTION

PATENT NO. : 4,383,325
DATED : May 10, 1983
INVENTOR(S) : MANFRED NAUJOKS, GERHARD HANTEL

It is certified that error appears in the above-identified patent and that said Letters Patent are hereby corrected as shown below:

Title page, the name of the assignee printed as "Technik mbH GHT, Gesellschaft für Hochtemperaturreaktor" should read --GHT, Gesellschaft für Hochtemperaturreaktor-Technik mbH--.

Signed and Sealed this

Fifteenth Day of May 1984

[SEAL]

Attest:

GERALD J. MOSSINGHOFF

Attesting Officer

Commissioner of Patents and Trademarks